United States Patent
Weinstein et al.

(10) Patent No.: US 6,425,394 B1
(45) Date of Patent: Jul. 30, 2002

(54) HANGER ASSEMBLY FOR PASSENGER OXYGEN MASKS

(75) Inventors: Sara G. Weinstein, Overland Park; Gary R. Hannah, Shawnee, both of KS (US)

(73) Assignee: BE Intellectual Property Inc., Wellington, FL (US)

( * ) Notice: Subject to any disclaimer, the term of this patent is extended or adjusted under 35 U.S.C. 154(b) by 0 days.

(21) Appl. No.: 09/684,998

(22) Filed: Oct. 10, 2000

(51) Int. Cl.[7] .............................................. A61M 15/00
(52) U.S. Cl. ............................... 128/200.24; 128/204.29
(58) Field of Search ...................... 128/200.24, 206.27, 128/206.28, 206.12, 205.21–205.25, 204.18, 206.13, 206.16, 204.29, 202.27, 207.11, 207.12; 244/118.5, 147, 129.4

(56) References Cited

U.S. PATENT DOCUMENTS

| | | | | |
|---|---|---|---|---|
| 2,931,355 A | * | 4/1960 | Miller et al. ................. | 128/142 |
| 3,379,195 A | * | 4/1968 | Bleach ..................... | 128/146.3 |
| 3,503,394 A | * | 3/1970 | Hotz et al. ............. | 128/206.27 |
| 3,981,302 A | * | 9/1976 | Veit ............................ | 128/203 |
| 4,241,833 A | * | 12/1980 | Luebcke ...................... | 206/570 |
| 4,244,361 A | * | 1/1981 | Neubert ................. | 128/200.14 |
| 4,481,945 A | * | 11/1984 | Levine .................. | 128/206.27 |
| 4,559,939 A | * | 12/1985 | Levine et al. .......... | 128/201.28 |
| 4,609,166 A | * | 9/1986 | Brennan ................... | 244/118.5 |
| 4,710,756 A | * | 12/1987 | Thornburg et al. ..... | 128/206.27 |
| 4,840,171 A | * | 6/1989 | Rohling et al. ........ | 128/204.16 |
| 4,862,147 A | * | 8/1989 | Thomas ................. | 128/201.23 |
| 4,909,247 A | * | 3/1990 | Terrisse et al. ........ | 128/206.27 |
| 5,078,343 A | * | 1/1992 | Howlett .................... | 244/118.5 |
| 5,301,665 A | * | 4/1994 | Jumpertz et al. ...... | 128/202.26 |
| 5,746,492 A | * | 5/1998 | Tai ........................ | 128/206.12 |
| 5,816,244 A | * | 10/1998 | Aulgur .................. | 128/206.27 |
| 5,954,052 A | * | 9/1999 | McDonald et al. .... | 128/206.27 |
| 6,062,221 A | * | 5/2000 | Brostrom et al. ...... | 128/206.27 |
| 6,089,230 A | * | 7/2000 | Barker et al. .......... | 128/204.29 |

* cited by examiner

Primary Examiner—John G. Weiss
Assistant Examiner—Teena Mitchell
(74) Attorney, Agent, or Firm—Hovey Williams LLP

(57) ABSTRACT

A passenger oxygen mask assembly (93) is provided which is adapted to be supported on an existing mask-supporting fixture (16). The assembly (93) includes a hanger (30, 64) having a fixture attachment portion (32, 66) and a mask-retaining portion (34, 68), as well as a conventional oxygen mask (92). The attachment portion (32, 66) has a lower leg (36, 70) presenting a recess (42, 76) adapted to receive the mounting post (18) of a fixture (16), as well as upstanding support arms (50–56, 78, 80). The mask-retaining portion (34, 68) includes segments (58, 60, 88) supported by the arms (50–56, 78, 80). When the hanger (30, 64) is mounted on a fixture (16), a mask (92) may be inserted into the hanger (30, 64) and is releasably retained thereby.

17 Claims, 3 Drawing Sheets

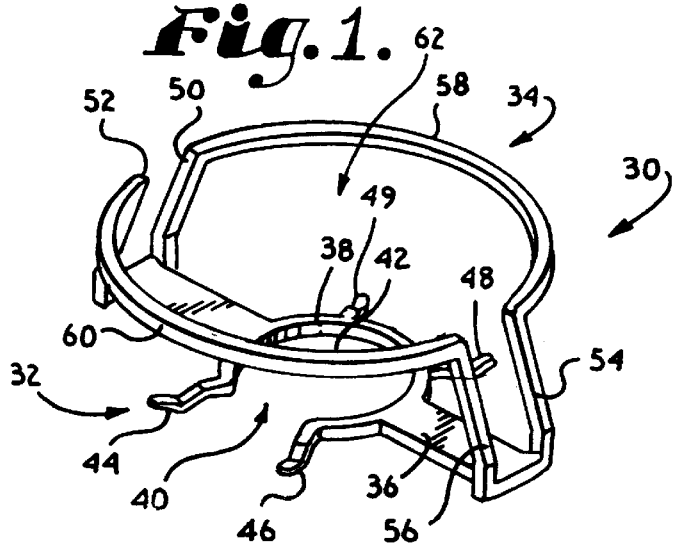
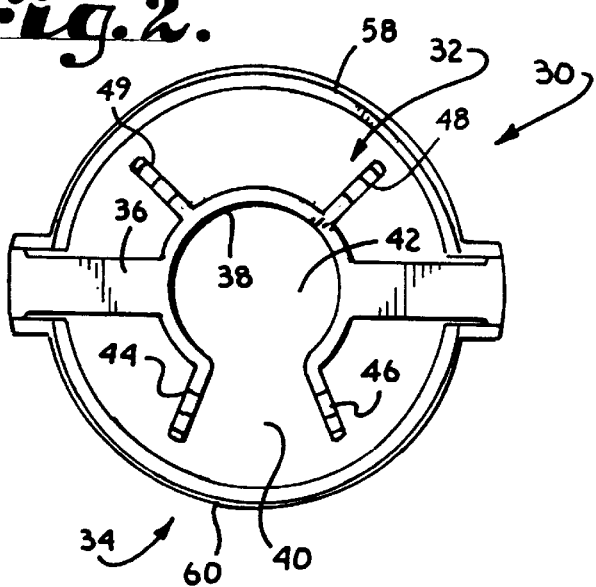
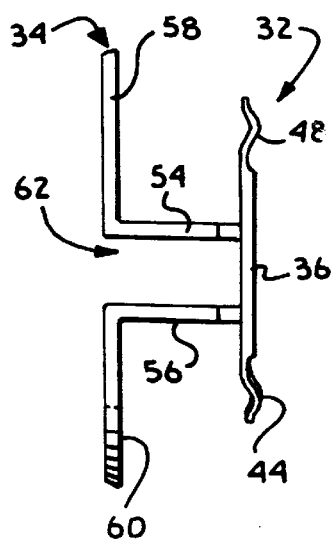

HANGER ASSEMBLY FOR PASSENGER OXYGEN MASKS

BACKGROUND OF THE INVENTION

1. Field of the Invention

The present invention is broadly concerned with passenger oxygen mask assemblies including relatively low cost, conventional passenger oxygen masks wherein the assemblies are designed to be supported on existing mask-supporting fixtures in commercial aircraft passenger service units. More particularly, the invention is concerned with such mask assemblies, as well as the hangers forming a part thereof, where the hangers are designed for manual attachment to the existing mask fixtures without requiring any fixture modification, and where the standard oxygen masks are releasably supported by the hangers.

2. Description of the Prior Art

All commercial passenger aircraft provide emergency oxygen masks for use by passengers in the event of a cabin depressurization or other emergency. Conventionally, a passenger service unit is located above the passenger seats and has a drop-down door which opens when passenger oxygen is required. In many such service units, the masks drop under the influence of gravity to a location adjacent the passengers. In other designs, the masks are retained on the inner surface of the drop-down door, but can readily be grasped and removed by the passengers.

In one specific design used in DC-9 aircraft, the passenger service unit door has a series of fixtures each designed to support an oxygen mask. However, owing to the configuration of the fixtures, oxygen masks must be provided which are different from most standard masks. That is, the widely used standard passenger oxygen masks cannot be used in the DC-9 aircraft, because such masks do not properly fit onto the preexisting mask fixtures. This presents a real problem, however, inasmuch as the DC-9 masks are considerably more expensive to manufacture than the standard, more widely used masks. In addition, airlines having a mixed fleet of aircraft must purchase and stock the DC-9 masks as well as other masks.

While it would be theoretically possible to redesign the DC-9 passenger service units, this would entail retrofitting of all of the units for all of the DC-9 aircraft. This would represent a very considerable expense to the airlines.

It would therefore be a decided advantage if the standard passenger oxygen masks could be used in DC-9 aircraft without modification or other retrofitting of the passenger service units thereof.

SUMMARY OF THE INVENTION

The present invention overcomes the problems outlined above and provides a passenger oxygen mask assembly adapted to be supported on a preexisting mask-supporting fixture. Broadly speaking, the mask assemblies of the invention include a hanger adapted for mounting on the existing fixtures, together with standard oxygen masks supported by the hangers and being manually separable therefrom.

The preferred hangers each include an attachment portion and an adjacent mask-retaining portion. The attachment portion is configured to engage the existing fixture and mount the hanger thereon. The mask-retaining portion on the other hand is designed to support a conventional oxygen mask. The hangers of the invention may be formed from any suitable material such as resilient synthetic resin or wire. The cost of the fixtures is such that owners of DC-9 aircraft experience reduced costs by purchasing and using the hangers with standard masks, as opposed to continuous use of the much more costly DC-9 masks.

In preferred forms, the attachment portions of the hangers include an elongated, shape-retaining central leg having spaced apart ends and a recess intermediate the ends; the recess is configured to receive the upstanding post forming a part of the existing DC-9 mask fixture. The mask-retaining portion is supported by the ends of the attachment portion leg and includes one or more elongated members which at least partially define an opening for receiving the conventional mask.

BRIEF DESCRIPTION OF THE DRAWINGS

FIG. 1 is a perspective view of a preferred passenger oxygen mask hanger;

FIG. 2 is a plan view of the hanger depicted in FIG. 1;

FIG. 3 is a side view of the hanger of FIGS. 1–2;

DETAILED DESCRIPTION OF THE PREFERRED EMBODIMENT

Figure 9:
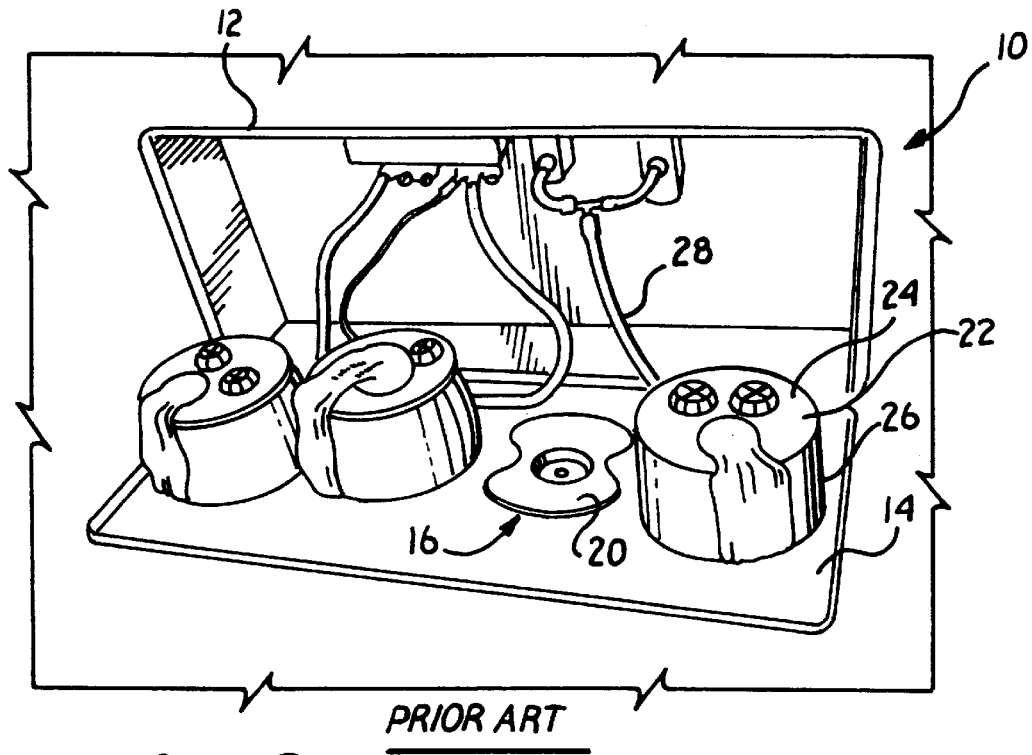
FIG. 9 is a perspective view illustrating a passenger service unit door similar to that of FIG. 8, but showing the prior art oxygen masks directly mounted on the door fixtures.

Turning now to the drawings, FIG. 9 illustrates a prior art passenger service unit 10 normally located directly above a row of seats in commercial passenger aircraft, and particularly DC-9 aircraft. The unit 10 includes a housing 12 together with a door 14 hingedly secured thereto and normally closing the housing. The inner surface of the door 14 has a plurality of laterally spaced apart fixtures 16 mounted thereon. Each such fixture (see also FIG. 4) is integral and includes a central mounting post 18 together with a curvilinear, laterally extending body 20 referred to in the art as a "butterfly." Each fixture 16 is designed to support an individual passenger oxygen mask 22. As illustrated in FIG. 9, each mask 22 includes a top wall 24 and a generally cylindrical sidewall 26, and is coupled via a conduit 28 to a suitable oxygen source, chemical, gaseous or otherwise (not shown). As explained above, the manufacturing and distribution costs associated with the masks 22 are considerable, and are significantly greater than the conventional passenger oxygen masks in widespread use in other types of aircraft.

In order to allow use of the lower cost oxygen masks in DC-9 aircraft or other planes using the butterfly fixtures 16, the present invention provides a hanger 30 of the type illustrated in FIGS. 1–3. This hanger is a unitary, injection molded synthetic resin body (preferably fabricated from resilient flame retardant polypropylene) including an attachment portion 32 and a spaced mask retaining portion 34. In detail, the attachment portion 32 includes a central leg 36 having at its center an arcuate segment 38 presenting an open throat 40 and a recess 42. The throat 40 is defined by a pair of relatively diverging legs 44, 46 which extend outwardly from the adjacent ends of the segment 38. In addition, a third and fourth legs 48 and 49 extend from segment 38. As illustrated in FIG. 3, the legs 44–49 have an arcuate outermost section defining respective feet for the hanger 30. The portion 32 also includes two pairs of upwardly and inwardly extending arms 50, 52 and 54, 56; as illustrated, these arms are integral with the central leg 36.

The mask-retaining portion 34 comprises a pair of arcuate, substantially semicircular members 58, 60 integral with and supported by the arms 50–56. In particular, the member 58 is supported by the arms 50, 54, whereas the opposed segment 60 is supported by the arms 52, 56. It will readily be seen that the segments 58, 60 cooperatively define a substantially circular space 62.

FIGS. 4–7 illustrate another hanger 64 in accordance with the invention. In this instance, the hanger 64 is fabricated from resilient metallic wire and includes an attachment portion 66 as well as a mask retaining portion 68. The portion 66 is formed of a continuous wire leg 70 with a central segment 72 presenting an open throat 74 and a generally circular recess 76. The leg 70 extends in opposite directions from the segment 72 as shown, and terminates in upwardly and inwardly extending arms 78, 80. As illustrated, three downwardly extending feet 82, 84, 86 are formed in the leg 70 respectively at the center of segment 72 and on opposite sides thereof.

The mask-retaining portion 68 is in the form of an essentially circular member 88 which is affixed to and supported by the opposed arms 78, 80. The member 88 thus defines a substantially circular space 90.

Figure 4:
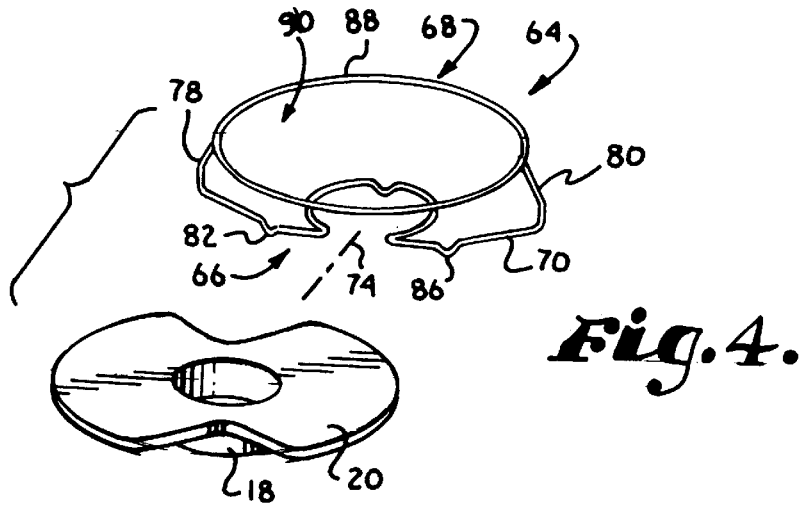
FIG. 4 is a perspective view illustrating an existing mask-supporting fixture with another type of mask hanger in accordance with the invention.
Figure 5:
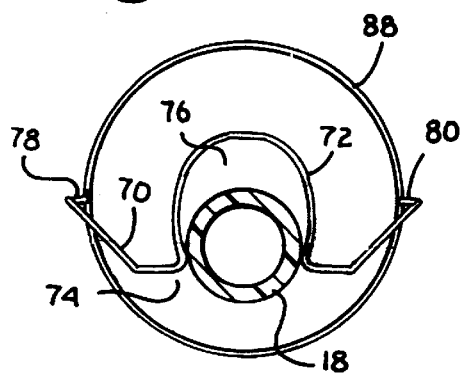
FIG. 5 is a sectional view illustrating the manner in which the hangers of the invention are installed onto the existing fixtures.
Figure 6:
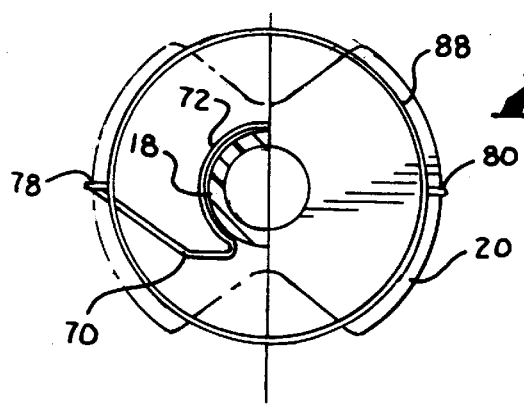
FIG. 6 is a top view in partial section illustrating the hanger fully mounted on the existing fixture.

Attention is next directed to FIGS. 4–6, which illustrate the manner in which the hangers of the invention are mounted on the fixtures 16. While the hanger 64 is illustrated in these Figures, it will be understood that mounting of hanger 30 proceeds in exactly the same fashion. In the first mounting step (FIG. 5), the hanger 64 is grasped and placed so that the throat 74 is adjacent the fixture post 18, with the member 88 located above the fixture body 20. This is made possible owing to the fact that the leg 70 extends outwardly beyond the margin of the body 20, with the arms 78, 80 extending upwardly and inwardly therefrom. Next, the hanger 64 is pushed into its operative position shown in FIG. 6, with the resilient segment 72 in substantially continuous and conforming engagement with the post 18. In this orientation, the member 88 is located in spaced relationship above the fixture body 20. It will also be observed that the feet 82–86 rest against the surface of passenger surface unit 14 (FIG. 7), to thereby stabilize the hanger 64 on the fixture.

Figure 7:
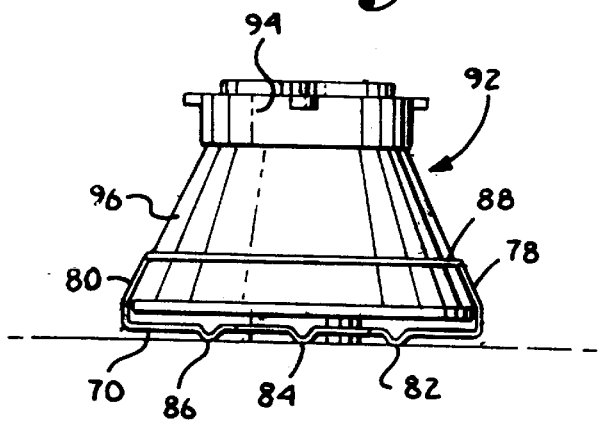
FIG. 7 is a side elevational view depicting a completed mask assembly made up of the hanger illustrated in FIGS. 4–5 with a conventional oxygen mask removably supported by the hanger.
Figure 8:
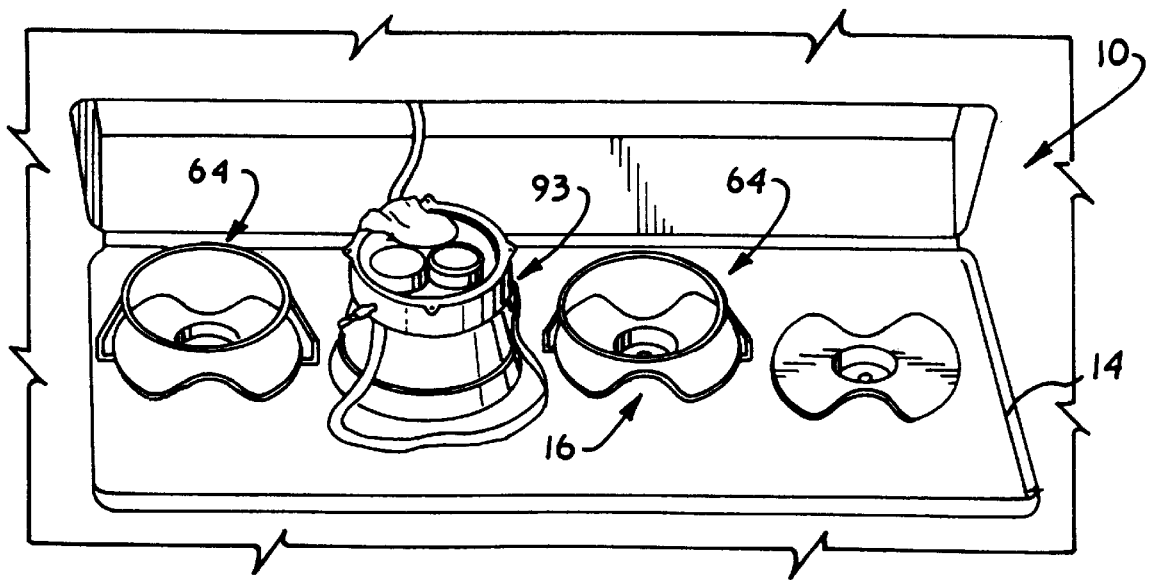
FIG. 8 is a perspective view illustrating a passenger service unit door with a series of existing fixtures thereon, and with certain of the fixtures equipped with hangers of the invention.

Once the hanger 64 is properly mounted on the fixture 16, a conventional oxygen mask 92 may be inserted into the hanger to form a hanger-mask assembly 93. This condition is illustrated in FIG. 7, where it will be seen that the mask 92 has a top wall 94 as well as an outwardly diverging, flexible frustoconical sidewall 96. In practice, the sidewall 96 is slightly deformed so as to pass into the space 90 defined by the member 88, with the latter in engagement with the outer surface of the mask sidewall. When engaging the outer surface or periphery of the sidewall 96, the member 88 is in contact with and extends around greater than 50% of the outer periphery of said sidewall 96. This suffices to hold the mask in place during normal service. In the event of an emergency, the unit door 14 would drop open in the well known fashion, revealing the masks 92 supported at each of the fixture locations by means of the hangers 64 (FIG. 8). The passengers can then readily remove the masks 92 from their associated hangers 64 by merely grasping the mask and pulling outwardly and downwardly. The hanger 64 is configured so that such removal can be readily accomplished, with the hangers 64 remaining in place on the fixtures 16.

As indicated previously, the attachment and use of the molded synthetic resin hanger 30 exactly parallels the above description relative to the wire hanger 64.

We claim:

1. A passenger oxygen mask assembly adapted to be supported on a mask-supporting fixture, said mask assembly comprising:

a hanger including an attachment portion and a mask-retaining portion, said attachment portion configured to engage said fixture and mount the hanger thereon; and an oxygen mask supported by said mask-retaining portion and releasably retained thereby, said mask being manually separable from said hanger, said fixture having a connection post and a body extending laterally from said post, said attachment portion including an elongated, shape-retaining leg having spaced apart ends and a recess intermediate said ends, said recess configured to receive said post, said ends extending outboard of said fixture body.

2. The assembly of claim 1, said mask-retaining portion supported by said leg ends and having an elongated member at least partially defining an opening for receiving said mask.

3. The assembly of claim 1, said mask-retaining portion including an elongated member secured to said attachment portion and spaced from said fixture when the hanger is mounted thereon.

4. The assembly of claim 3, said member being of generally circular configuration.

5. The assembly of claim 1, said hanger formed of metal wire.

6. The hanger of claim 1, said hanger formed of resilient synthetic resin material.

7. A hanger for attachment to a fixture designed to support a first oxygen mask, said fixture comprising a connection post having an outer end and a laterally extending body secured to the outer end of the post and presenting a margin, said hanger comprising an attachment portion and a mask-retaining portion, said attachment portion including an elongated leg having spaced apart ends and a recess intermediate said ends, said recess configured to receive said post with said spaced apart ends extending outboard of said body, said mask-retaining portion including an elongated arcuate member secured to said leg ends and spaced from said body and configured to support a second oxygen mask different than said first oxygen mask.

8. The hanger of claim 7, said mask-retaining portion being generally circular.

9. The hanger of claim 7, said leg ends extending around the margin of said body and overlying the body in spaced relationship thereto.

10. The hanger of claim 7, said hanger formed of wire.

11. The hanger of claim 7, said hanger formed of synthetic resin material.

12. A passenger oxygen mask assembly adapted to be supported on a mask-supporting fixture, said mask assembly comprising:

a hanger including an attachment portion and a mask-retaining portion, said attachment portion configured to engage said fixture and mount the hanger thereon and said mask-retaining portion including a generally arcuate elongated member; and an oxygen mask supported by said mask-retaining portion and releasably retained thereby, said mask presenting a sidewall having an outer periphery and being manually separable from said hanger, said elongated member being in contact with and extending around greater than 50% of the outer periphery of said sidewall.

13. The assembly of claim 12, said fixture having a connection post and body extending laterally from said post, said attachment portion including an elongated, shape-retaining leg having spaced apart end and a recess intermediate said ends, said recess configured to receive said post, said ends extending outboard of said fixture body.

14. The assembly of claim 13, said mask-retaining portion supported by said leg ends and said elongated member at least partially defining an opening for receiving said mask.

15. The assembly of claim 12, said mask-retaining portion spaced from said fixture when the hanger is mounted thereon.

16. The assembly of claim 12, said hanger formed of metal wire.

17. The hanger of claim 12, said hanger formed of resilient synthetic resin material.

\* \* \* \* \*